| United States Patent [19] | [11] 4,011,916 |
|---|---|
| Neal et al. | [45] Mar. 15, 1977 |

[54] CHISEL PLOW MOUNT

[75] Inventors: Archie Neal; Paul Moore, both of Garfield, Wash.

[73] Assignee: Love Company, Garfield, Wash.

[22] Filed: July 11, 1975

[21] Appl. No.: 595,020

[52] U.S. Cl. .............................. 172/710; 172/265; 172/705
[51] Int. Cl.² ........................................ A01B 65/00
[58] Field of Search .......... 172/661, 710, 705, 707, 172/708, 265

[56] References Cited

UNITED STATES PATENTS

| 412,827 | 10/1889 | Barber | 172/707 |
| 2,257,650 | 9/1941 | Pfeifer et al. | 172/708 X |
| 2,761,368 | 9/1956 | Harrop | 172/710 |
| 3,314,487 | 4/1967 | Kopaska et al. | 172/710 |
| 3,536,146 | 8/1967 | Groenke | 172/710 |
| 3,606,928 | 9/1971 | Quanbeck | 172/710 |
| 3,700,039 | 10/1972 | Essex et al. | 172/705 X |
| 3,782,481 | 1/1974 | Quanbeck | 172/710 X |
| 3,825,073 | 7/1974 | Gardner et al. | 172/710 |

FOREIGN PATENTS OR APPLICATIONS 691,537   7/1964   Canada .............................. 172/708

*Primary Examiner*—George J. Marlo
*Attorney, Agent, or Firm*—Wells, St. John & Roberts

[57] ABSTRACT

A spring tooth chisel plow has its upper shank secured within a channel retainer pivotally mounted adjacent the rear edge of the retainer to a mounting bracket secured to a tool bar. The shank of the chisel plow is held within the channel retainer by a transverse clamping bar positioned radially from the main pivot, the forward end of the shank being fixed to the channel retainer. The upper surface of the retainer normally abuts a complementary surface on the mounting bracket, which supports an upwardly extending compression spring assembly. A tension bolt pivotally connects the forward end of the retainer to the upper end of the compression spring assembly, whereby force exerted on the chisel point of the plow is resisted by the compression spring assembly.

7 Claims, 6 Drawing Figures

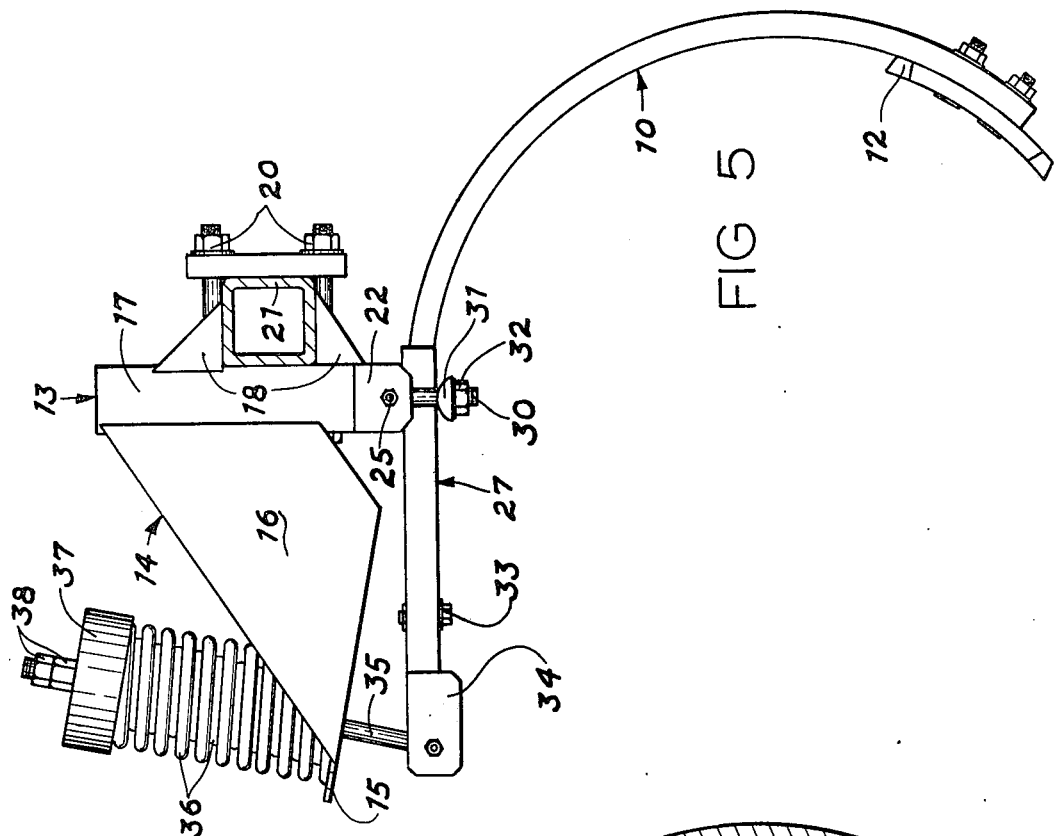
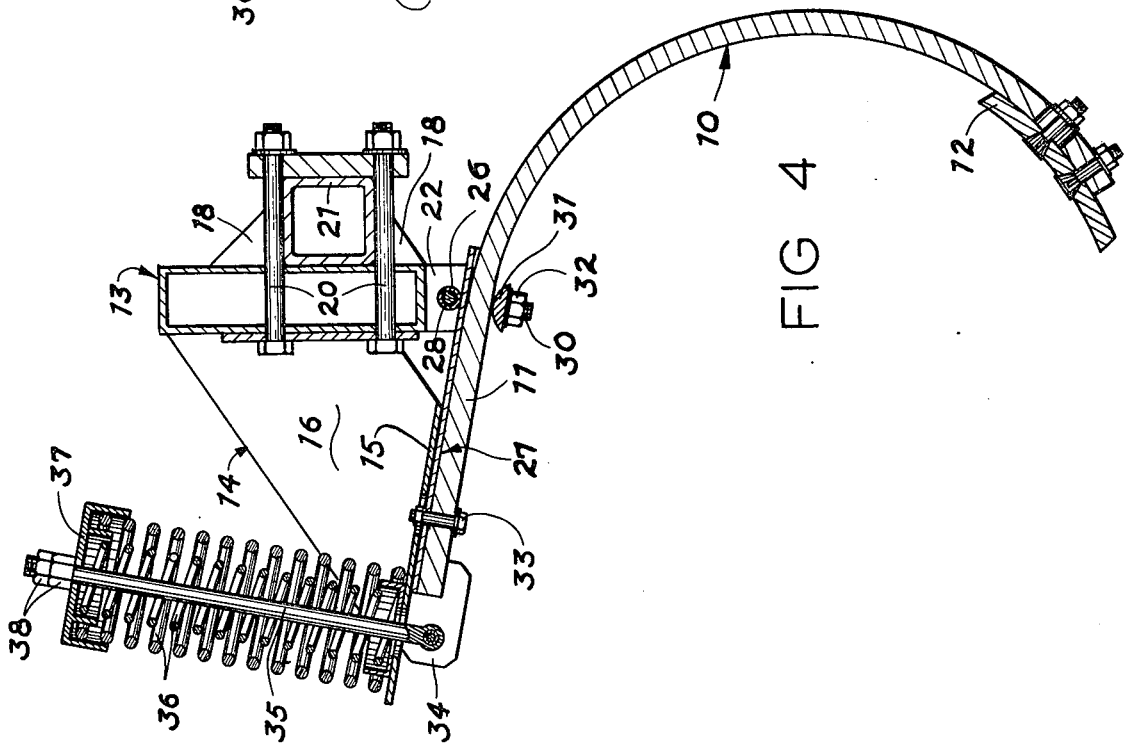

CHISEL PLOW MOUNT

BACKGROUND OF THE INVENTION

This invention relates to the mounting of spring tooth chisel plows, widely used for agricultural purposes. The plows are typically arranged in multiples and are staggered along transverse tool bars pulled by agricultural vehicles. The spring tooth chisel plow must be mounted so that it can yield when engaging a rock or soil that is particularly difficult to plow, thereby avoiding breakage. This requires that the stresses in the plow be distributed so as not to be concentrated across sharp lines. It also is necessary to mount the individual chisel plows in a manner that permits easy removal and replacement of a plow when damage does occur.

The present disclosure provides a novel mount for a chisel plow, with the plow shank in such a way as to minimize the concentration of forces due to bending of the shank. It uses elements that are readily fabricated and economical, spreading the forces of the compression springs and shank over relatively large areas. In addition, the main pivot shaft is secured within fabricated plates in such a manner as to maintain it stationary, with provision for readily tightening the shaft to remove any play that might develop during use of the apparatus.

SUMMARY OF THE INVENTION

The basic mount disclosed herein includes a forwardly protruding mounting bracket that is fixed to a tool bar when used. A transverse pivot shaft is fixed across the lower portion of the mounting bracket. A channeled shank retainer is pivoted to the shaft adjacent the rearward end of the shank retainer. The bent chisel plow is mounted in the shank retainer, with the shank of the plow fitted within the channel. A clamping bar is fixed across the retainer to maintain the shank therein, the clamping bar being located radially beneath the pivot shaft. Upright compression springs are supported on the mounting bracket and a pivoted tension bolt operatively connects the forward end of the shank retainer and the upper surfaces of the upright compression spring.

It is a first object of this invention to provide an effective and practical mounting arrangement for spring tooth chisel plows.

Another object of this invention is to utilize elements in the mount which can be readily fabricated from either sheet material or other common forms of available metal structures.

Another object of this invention is to minimize the concentration of force at the connections between the spring tooth chisel plow and the apparatus that movably secures it relative to a tool bar.

These and further objects will be evident from the following disclosure, taken together with the accompanying drawings which illustrate a preferred embodiment of the invention.

BRIEF DESCRIPTION OF THE DRAWINGS

FIG. 4 is a vertical sectional view of the mount as seen along line 4—4 in FIG. 3;
FIG. 5 is a side elevation view showing the yieldability of the mount under operating load.

DETAILED DESCRIPTION OF A PREFERRED EMBODIMENT

Figure 1:
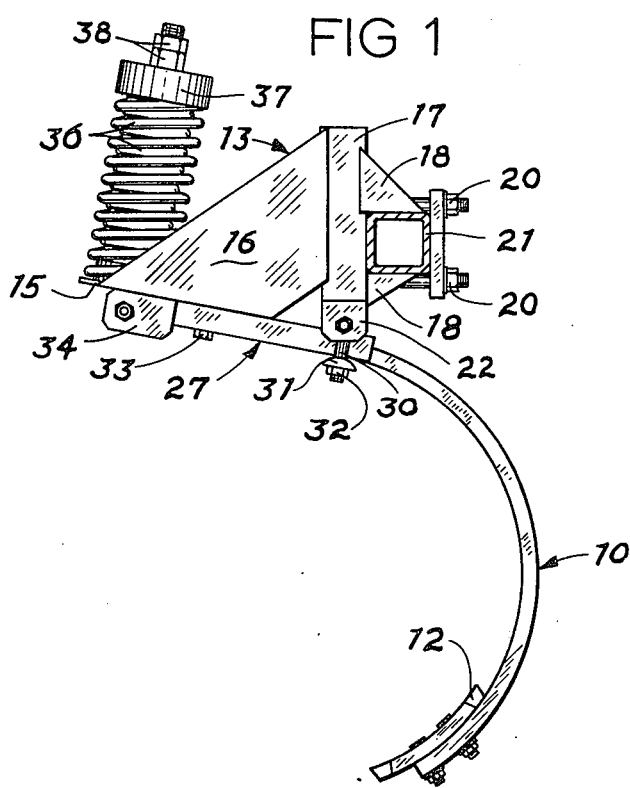
FIG. 1 is a side elevation view of the present mount.
Figure 3:
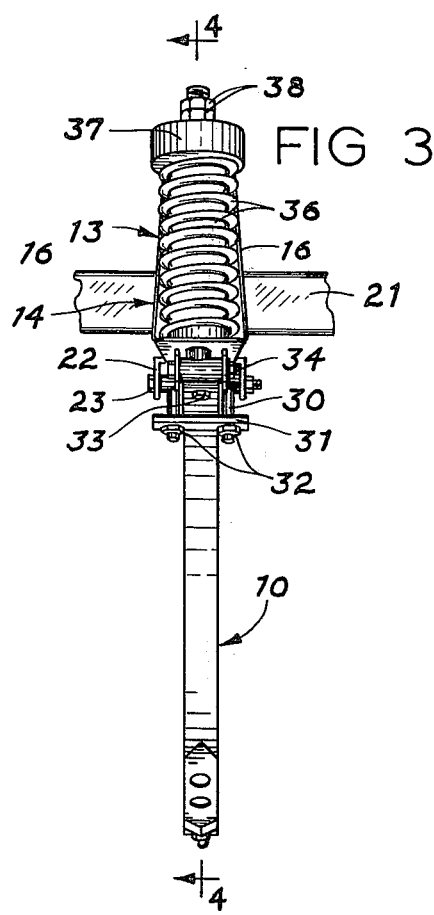
FIG. 3 is a front view of the mount.
Figure 2:
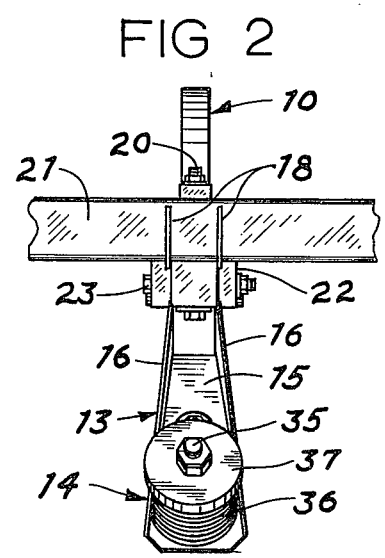
FIG. 2 is a top view of the mount.
Figure 6:
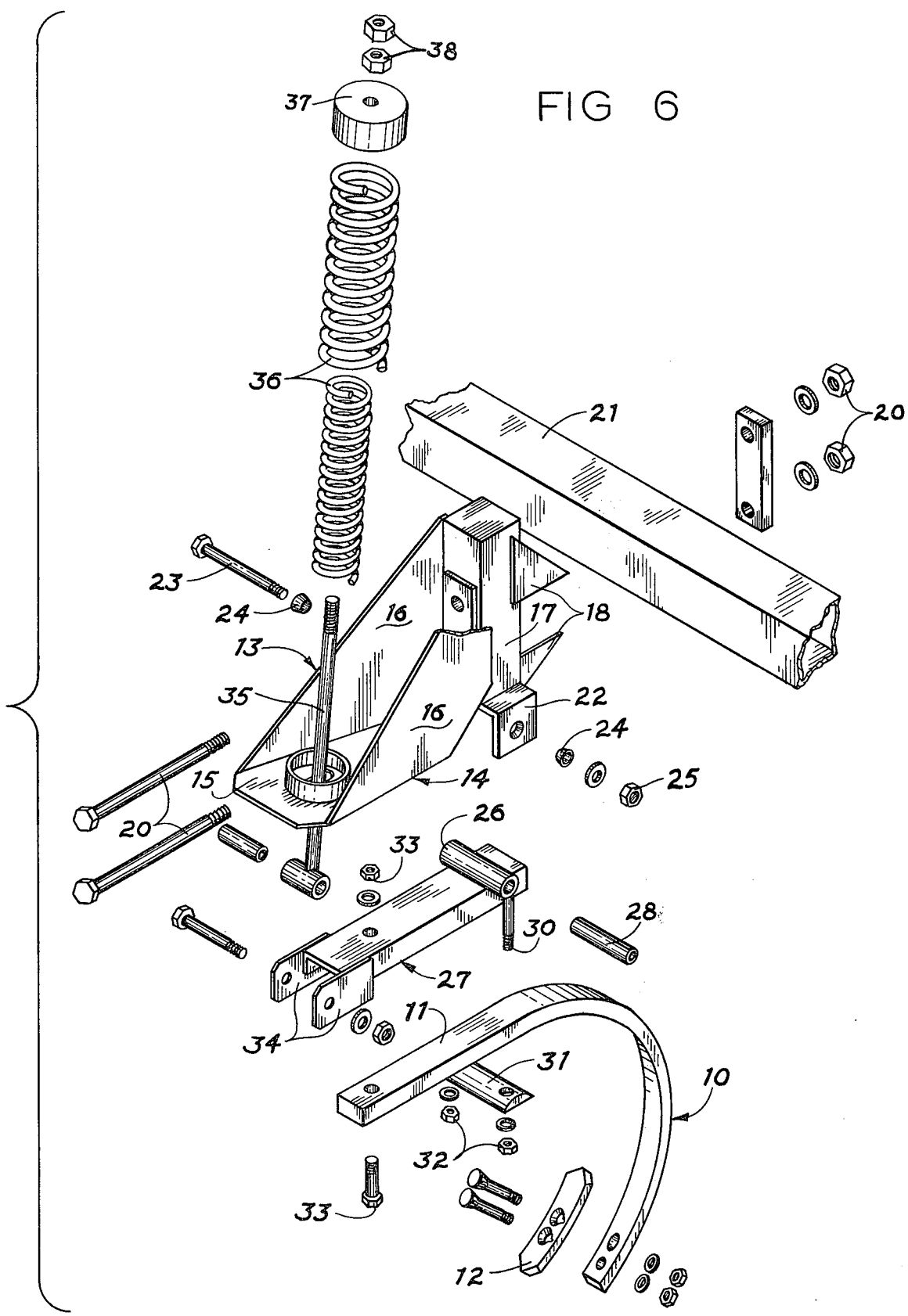
FIG. 6 is an exploded perspective view of the mount.

The structure illustrated in the drawings is designed for mounting of curved spring tooth chisel plows on a conventional transverse tool bar. A plurality of plows are typically mounted in staggered relation to one another across a multiple number of tool bars pulled through a field by a tractor. The plow, generally designated by the numeral 10, is bent in the form of the letter "C". The plow structure includes an upper shank 11 that extends forwardly and is in a substantially horizontal position on the mounted implement. The shank 11 is substantially flat and not curved. The lower end of the plow has a replaceable bit or chisel point 12 fastened to it.

A mounting bracket is generally illustrated at 13. It comprises a folded spring support 14 that is produced from a single sheet of metal. The support 14 includes a lower plane panel 15 and folded flaps 16 which extend upwardly and rearwardly along the panel 15. The rear edges of the respective flaps 16 are fixed along the sides of a vertical member 17 which is preferably tubular. Rearwardly protruding positioning tabs 18 are fixed at the sides of the member 17 to elevationally locate member 17 on a conventional tool bar 21. The member 17 secures the mounting bracket 13 to the tool bar by means of bolt assemblies shown at 20.

When located on the tool bar, the lower surface of the panel 15 is slightly inclined from the horizontal (FIG. 1). The lower surface of panel 15 is normally abutted by the upper surface of a shank retainer 27 that mounts the shank 11 of the spring tooth chisel plow 10. The shank retainer 27 is in the form of an elongated channel, having a center web and downwardly extending longitudinal flanges. The inner dimensions between the flanges and web of the retainer 27 are substantially identical to the external dimensions of the plow shank 11, so that the shank can be fitted within the channel and bear against the inside surfaces of retainer 27.

The shank retainer 27 has a pivot tube 26 fixed across its upper surface adjacent its rearward end. The pivot tube 26 is pivotably mounted about a pivot shaft 23 fixed across downwardly projecting ears 22 at the lower end of vertical member 17. A bushing 28 provides a bearing surface between the interior of pivot tube 26 and the exterior cylindrical surface of shaft 23.

One problem encountered with prior mounts for chisel plows is the loosening of the pivot shaft after extended use of the equipment. To provide a secure mount for the pivot shaft in the fabricated assembly illustrated, we utilize split conical sleeves 24 that fit within complementary apertures in each ear 22. The pivot shaft is maintained in a rigid fixed position on the mounting bracket by means of the split sleeves 24. The pivot shaft is shown in the form of a bolt having an enlarged head at one end and a shank that is threaded at the remaining end of the bolt. The shaft or shank of the bolt is initially loosely received through the opposed conical sleeves that fit within the apertures formed within the respective ears 22. However, nut 25 permits the head of the bolt and the nut itself to abut the outer surfaces of the respective sleeves and pull them toward one another in response to tightening of the nut 25. The axial adjustment of these abutments causes the sleeves to be compressed between the pivot shaft and the apertures for the sleeves, thereby eliminating relative movement between them. This serves to initially mount the pivot shaft in a fixed position. Should the pivot shaft loosen during use of the implement, further tightening of nut 25 will again secure the shaft 25 in its desired fixed relationship with respect to the mounting bracket 13.

The shank 11 is fixed within the retainer 27 by a mounting bolt assembly 33 that extends through shank 11 and the web in the shank retainer 27. The shank also is secured by means of a transverse clamping bar 31 that extends across the lower edges of the flanges in shank retainer 27. The upper surface of the clamping bar 31 is convex and continuous across its full width. It is held in place by radial studs 30 fixed to the pivot tube 26 and outside surfaces of the flanges on shank retainer 27. Nuts 32 retain the clamping force applied to the shank retainer 27 is centered about the axis of the pivot shaft 23.

When used in a field, the spring tooth chisel plow 10 is subjected at times to substantial forces. This occurs when it engages a rock or when plowing through areas of very hard soil. While part of this force is absorbed by deflection of the plow structure itself, exceptional loading is absorbed through a compression spring assembly and a pivotal movement of the shank retainer 27 about the transverse axis of pivot shaft 23.

A pair of coaxial compression springs 36 are mounted at the top surface of the panel 15 within the mounting bracket 13. They are centered about an aperture formed through the panel 15, which freely receives a tension bolt 35. The lower end of the tension bolt 35 is pivotably connected to a pair of extensions 34 which extend forwardly along the side of the shank retainer 27. The upper end of the bolt 35 protrudes above the compression springs 36. It is received through an aperture in a cover plate 37 that abuts the upper ends of the springs 36. A nut 38 is threadably mounted to the tension bolt 35 and can be adjusted along the length of the bolt 35 to preset the initial loading applied to the shank retainer 27.

FIG. 5 illustrates the yieldability of the assembly, and the manner by which forces are not accentuated along the shank 11 during compression of the springs 36. The shank retainer 27 extends slightly rearward beyond the pivot tube 26, and supports the abutting surfaces of the shank 11, which does not engage a sharp corner. The radial mounting of the clamping bar 31 and its convex upper surface eliminates any sharp surfaces that would accentuate or concentrate forces along the lower surface of shank 11. The relatively inexpensive mounting bracket provides a large bearing surface along the top of the shank retainer 27 to permit adequate free loading of the plow by means of the compression springs 36.

Various modifications might be made with respect to the details of the illustrated embodiment without deviating from the scope of this disclosure. The invention is not to be limited except as set out in the following claims.

Having thus described our invention we claim:

1. A chisel plow mount for agricultural implements, comprising:
    a forwardly protruding mounting bracket adapted to be fixed to a tool bar;
    a transverse horizontal pivot shaft fixed across the lower portion of the mounting bracket;
    a forwardly protruding shank retainer in the form of a downwardly-facing channel with longitudinal flanges projecting downward from a central web, the web having a pivotal connection with said pivot shaft at its upper surface adjacent the rearward end of the shank retainer;
    a bent chisel plow having a forwardly projecting shank at its upper end overlying the web within the area bounded by said flanges;
    a transverse clamping bar across the lower surfaces of the flanges of the shank retainer and the shank radially below the pivot shaft;
    means for fixing the forward end of the shank to the shank retainer at a position forward from the pivot shaft;
    upright compression spring means supported on the mounting bracket at a location above the forward end of the shank retainer;
    and tension means operatively connected between the forward end of the shank retainer and the upper end of the upright compression spring means for resisting downward movement of the forward end of the shank retainer by the compression of said compression spring means.

2. A chisel plow mount as set out in claim 1 wherein said compression spring means comprises an upright spiral compression spring abutting an upwardly-facing surface on the mounting bracket;
    said tension means comprising:
    a rigid bolt, the lower end of said bolt being pivotally connected to the forward end of the shank retainer about an axis parallel to the pivot shaft;
    a cover plate extending across the top of the compression spring and having a central aperture forward therein;
    the upper end of said bolt being received through the aperture of the cover plate;
    and an adjustable nut above the cover plate, the nut being threadably secured to the bolt so as to operatively abut the cover plate so as to transmit force from the bolt to the compression spring.

3. A chisel plow mount as set out in claim 1 wherein the clamping bar has an upwardly facing surface that has a continuous convex configuration extending transversely across the width of the shank retainer.

4. A chisel plow mount as set out in claim 1 wherein the clamping bar is releasably fixed to the shank retainer by a pair of bolts at the respective sides of the retainer, each bolt being aligned parallel to one another along a radial axis with respect to the center axis of the pivot shaft.

5. A chisel plow mount as set out in claim 1 wherein the mounting bracket comprises:
    a folded spring support fabricated rom a unitary metal sheet, said support having a planar lower rectangular panel bounded along opposite side edges by upwardly and forwardly extending triangular flaps which terminate along vertical edges;
    a vertical structural member fixed to the vertical edges of the sheet;
    and means for selectively fastening the vertical structural member to a tool bar.

6. A chisel plow mount as set out in claim 5 wherein the pivot shaft is fixed across downwardly projecting ears at the lower end of said vertical structural member.

7. A chisel plow mount as set out in claim 1 wherein the pivot shaft is received through apertures formed in transversely spaced ears that protrude downwardly from the mounting bracket;

a split conical sleeve interposed between the pivot shaft and the apertures in the respective ears; and enlarged abutment means at each end of the pivot shaft, bearing against the outer surfaces of the respective sleeves, said abutment means being axially adjustable to cause the sleeves to be compressed between the pivot shaft and apertures to thereby eliminate relative movement between them.

* * * * *